Nov. 11, 1958     M. RIDER     2,859,662
REFLECTING MARKER FOR VEHICLE DOORS
Filed April 27, 1953

INVENTOR.
MORRIS RIDER.
BY
ATTORNEY.

United States Patent Office 2,859,662
Patented Nov. 11, 1958

2,859,662

REFLECTING MARKER FOR VEHICLE DOORS

Morris Rider, Detroit, Mich.

Application April 27, 1953, Serial No. 351,181

3 Claims. (Cl. 88—81)

My invention relates to a new and useful improvement in a reflecting marker for vehicle doors. Experience has shown that when a vehicle door, such as the door of an automobile is opened the door projects outwardly a considerable distance from the body of the vehicle. Particularly during the night time the driver of a passing vehicle may quite easily fail to recognize that the door of the vehicle being passed is open with a resultant hazard to safety in traffic. Likewise when the vehicle door is open and the occupant alights from the vehicle, there is no protective device warning passing vehicles of the occupant's position.

It is an object of the present invention to provide a reflecting marker for mounting on a vehicle door in such a manner that the marker may be seen from the rear of the vehicle and serve to attract attention to the fact that the vehicle door is open.

It is an object of the present invention to provide a marker of this type having light reflecting qualities so that the rays of light from a vehicle approaching from the rear or the side will be reflected back to the driver of the vehicle while at the same time the marker would be of a luminescent type to attract attention also in the daytime.

Another object of the invention is the provision of a reflecting marker of this type which may be easily and quickly installed in position on a vehicle door and easily and quickly removed therefrom.

On most automobile doors a panel of upholstery is mounted on the inner side of the door and it is an object of the present invention to provide a marker of this class having securing means which may enter between the door and the panel of upholstery to retain the marker in position on the swingable edge face of the door and also on a portion of the upholstery.

Other objects will appear hereinafter.

It is recognized that various modifications and changes may be made in the detail of structure illustrated without departing from the invention and it is intended that the present disclosure shall be considered but the preferred embodiments of the invention.

Forming a part of this application are drawings in which.

Figure 1:
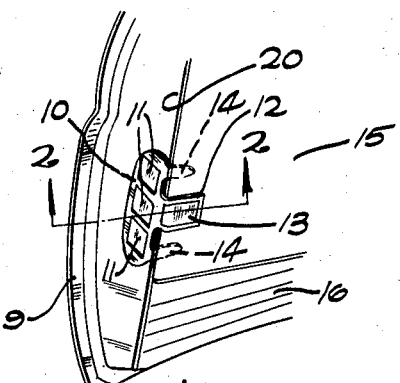
Fig. 1 is a perspective view of the invention showing it applied.

In the drawings I have illustrated a swingable vehicle door 9 having an end face 20. Mounted on the inner face 15 of the door is a panel 16 of upholstery.

The invention comprises a plate 10 formed preferably from metal and having on one face a reflecting body 11. In the drawings I have shown three of these reflecting bodies but it is believed obvious that only one is required.

The reflecting body is of a phosphorescent nature so that it will glow in the daytime and nighttime and serve as a light ray reflecting body.

Projecting outwardly from the opposite face of the body 10 is a tongue 12 having on its face a reflecting and luminescent body 13 such as the bodies 11.

Figure 4:
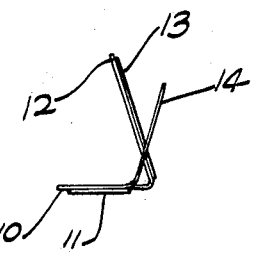
Fig. 4 is an end elevational view of the invention.

Projecting outwardly from the same face of the body 10 are the spaced apart tongues 14 which are preferably made shorter than the tongue 12. The body 10 is preferably formed of resilient material and as shown in Fig. 4 the tongues 14 are angularly turned relatively to the plane of the body 10 and the tongue 12 is angularly turned in the opposite direction.

In mounting the structure on a vehicle door the tongue 12 is brought into engagement with the inner face of the upholstery panel 16 and flexed until the tongues 14 are in alignment with the back side of the upholstery panel 16 whereupon the structure is moved inwardly of the end face of the door, the tongues 14 engaging between the face 15 and back side of the upholstery panel 16. This places the tongue 12 under tension so that it is held securely in engagement with the inner surface of the upholstery panel 16, the body 10 lying flat against the end face 20 of the swingable door.

With this construction mounted on the door, as soon as the vehicle door is opened slightly the reflecting bodies 11 will be exposed and serve their purposes as a warning. As the door is opened wider the reflecting body 11 will reflect from the side of the vehicle body while the reflecting body 13 on the tongue 12 will reflect toward the rear of the body.

In this way there is thus provided a reflecting marker which will serve the warning purpose referred to and function as a safety factor in the use of vehicles.

Figure 5:
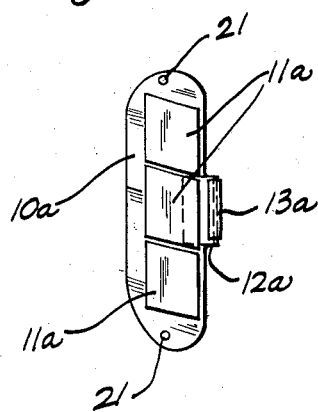
Fig. 5 is a perspective view of a modification.
Figure 6:
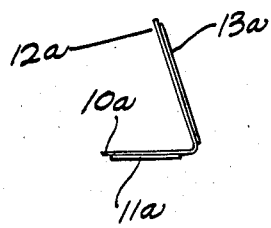
Fig. 6 is an end elevational view of the modified form.
Figure 7:
Fig. 7 is a sectional view taken on line 7—7 of Fig. 3.

In Fig. 5 I have illustrated a body 10a having the reflecting bodies 11a on the face thereof. A tongue 12a is formed integral with the body 10a and turned angularly thereto and provided on its face with a reflecting body 13a. Openings 21 are formed in the body 10a through which fastening means may be extended to secure the plate 10a on the end face of the door, the tongues 14 having been eliminated. The advantages of this marker are the same as that of the preferred form excepting as to the means for securing the structure on the vehicle door.

Figure 2:
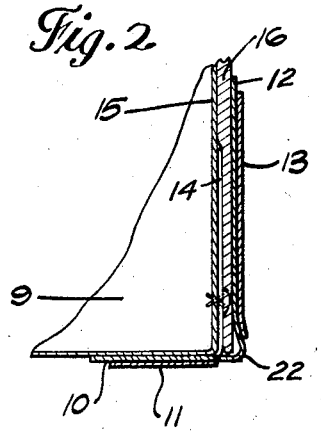
Fig. 2 is a fragmentary sectional view taken on line 2—2 of the Fig. 1.
Figure 3:
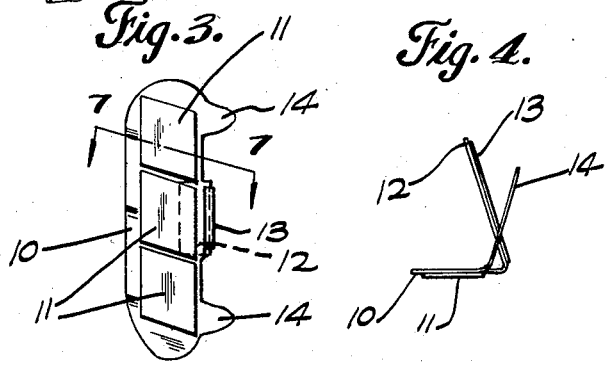
Fig. 3 is a perspective view of the invention.

From an examination of Fig. 2 it will appear that the tongue 12 extends outwardly from the body 10 a short distance before it is angularly turned to provide a curled portion 22 so that there is thus provided a space to accommodate the panel 16 of upholstery.

It will also be noted that the reflecting body 13 extends around the curved portion 23 so that a part of this reflecting body 13 lies in the plane of the reflecting body 11.

What I claim is:

1. A reflecting marker for swingably mounted vehicle doors having an inner face and an end face and provided with an upholstery panel covering the inner face thereof comprising: a supporting plate; a reflecting body on one face of said plate; a resilient tongue projecting outwardly from the rear edge of said plate; a resilient supporting tongue projecting outwardly from said edge of said plate; a reflecting marker on one face of said supporting tongue, said first named tongue being adapted to engage between said panel and the inner face of said door, and said second named tongue being adapted to engage with the inner face of said panel, said tongues, when mounted on the door, being flexed out of normal position for frictionally retaining said plate in engagement with the end face of said door for exposing the reflecting bodies thereon upon swinging of said door to open position.

2. A reflecting marker for swingably mounted vehicle doors having an inner face and an end face and provided with an upholstery panel covering the inner face thereof comprising: a supporting plate; a reflecting body on one face of said plate; a resilient tongue projecting outwardly from the rear edge of said plate; a resilient supporting tongue projecting outwardly from said edge of said plate; a reflecting marker on one face of said supporting tongue, said first named tongue being adapted to engage between said panel and the inner face of said door, and said second named tongue being adapted to engage with the inner face of said panel, said tongues, when mounted on the door, being flexed out of normal position for frictionally retaining said plate in engagement with the end face of said door for exposing the reflecting bodies thereon upon swinging of said door to open position, said second named tongue being provided at its attached end with a space for accommodating the edge of the upholstery panel.

3. A reflecting marker for swingable vehicle doors having an inner face and an end face and provided with an upholstery panel covering the inner face thereto comprising: a supporting plate; a reflecting body on one face of said plate; a plurality of resilient tongues projecting outwardly from the opposite face of said plate adjacent the rear edge thereof, said tongues being normally bent to lie in different planes, at least one of said tongues being adapted to engage between the inner face and the door of said panel and another of said tongues being adapted to engage the inner surface of said panel for frictionally holding said plate in engagement with the end face of said door; and a reflecting marker on one face of the tongue which is adapted to engage the inner surface of the panel, said reflecting marker being bent around the bend of said tongue and having a portion lying in the same plane as the reflecting body on said plate.

References Cited in the file of this patent

UNITED STATES PATENTS

| | | |
|---|---|---|
| 1,673,647 | Strang | June 12, 1928 |
| 1,792,671 | Winans | Feb. 17, 1931 |
| 1,943,440 | Horni | Jan. 16, 1934 |
| 2,216,576 | Sinsabaugh | Oct. 1, 1940 |
| 2,261,301 | Smith | Nov. 4, 1941 |
| 2,665,611 | Smith | Jan. 12, 1954 |